United States Patent
A. R. et al.

(10) Patent No.: US 9,043,492 B2
(45) Date of Patent: May 26, 2015

(54) METHOD TO PUBLISH REMOTE MANAGEMENT SERVICES OVER LINK LOCAL NETWORK FOR ZERO-TOUCH DISCOVERY, PROVISIONING AND MANAGEMENT

(71) Applicant: Dell Products L.P., Round Rock, TX (US)

(72) Inventors: Harikrishnan A. R., Banglore (IN); Trung M. Tran, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 283 days.

(21) Appl. No.: 13/776,855

(22) Filed: Feb. 26, 2013

(65) Prior Publication Data

US 2014/0244860 A1    Aug. 28, 2014

(51) Int. Cl.
*G06F 15/16*  (2006.01)
*H04L 29/12*  (2006.01)

(52) U.S. Cl.
CPC .................... *H04L 61/2007* (2013.01)

(58) Field of Classification Search
CPC ............... H04L 67/16; H04L 61/1511; H04L 29/12367; H04L 61/2514
See application file for complete search history.

(56) References Cited

U.S. PATENT DOCUMENTS

| | | | |
|---|---|---|---|
| 7,606,890 B1* | 10/2009 | Baier et al. | 709/224 |
| 2004/0268132 A1* | 12/2004 | Waris | 713/185 |
| 2006/0203774 A1* | 9/2006 | Carrion-Rodrigo | 370/331 |
| 2010/0082774 A1* | 4/2010 | Pitts | 709/219 |
| 2011/0246748 A1* | 10/2011 | Talwar et al. | 712/30 |

OTHER PUBLICATIONS

B. Mittapalli et al., U.S. Appl. No. 13/460,492, filed Apr. 30, 2012, entitled Discovery and Configuration of Network Devices via Data Link Layer Communications.

N. Subramaniam, U.S. Appl. No. 13/340,816, filed Dec. 30, 2011, entitled System and Method of Enabling a Multi-Chassis Switch for Virtual Server Network Provisioning.

* cited by examiner

*Primary Examiner* — Peling Shaw
(74) *Attorney, Agent, or Firm* — Terrile, Cannatti, Chambers & Holland, LLP; Stephen A. Terrile

(57) ABSTRACT

A system, method, and computer-readable medium are disclosed for realizing server management functionalities in the absence of a routable Internet Protocol (IP) network address of a remote access controller (RAC). A first device, which is operatively coupled to a link-local network, generates a Multicast Domain Name System (mDNS) IP multicast query message, which it then sends to a second device on the link-local network. In response, the second device, which comprises a RAC, returns its link-local IP address to the first device.

18 Claims, 4 Drawing Sheets

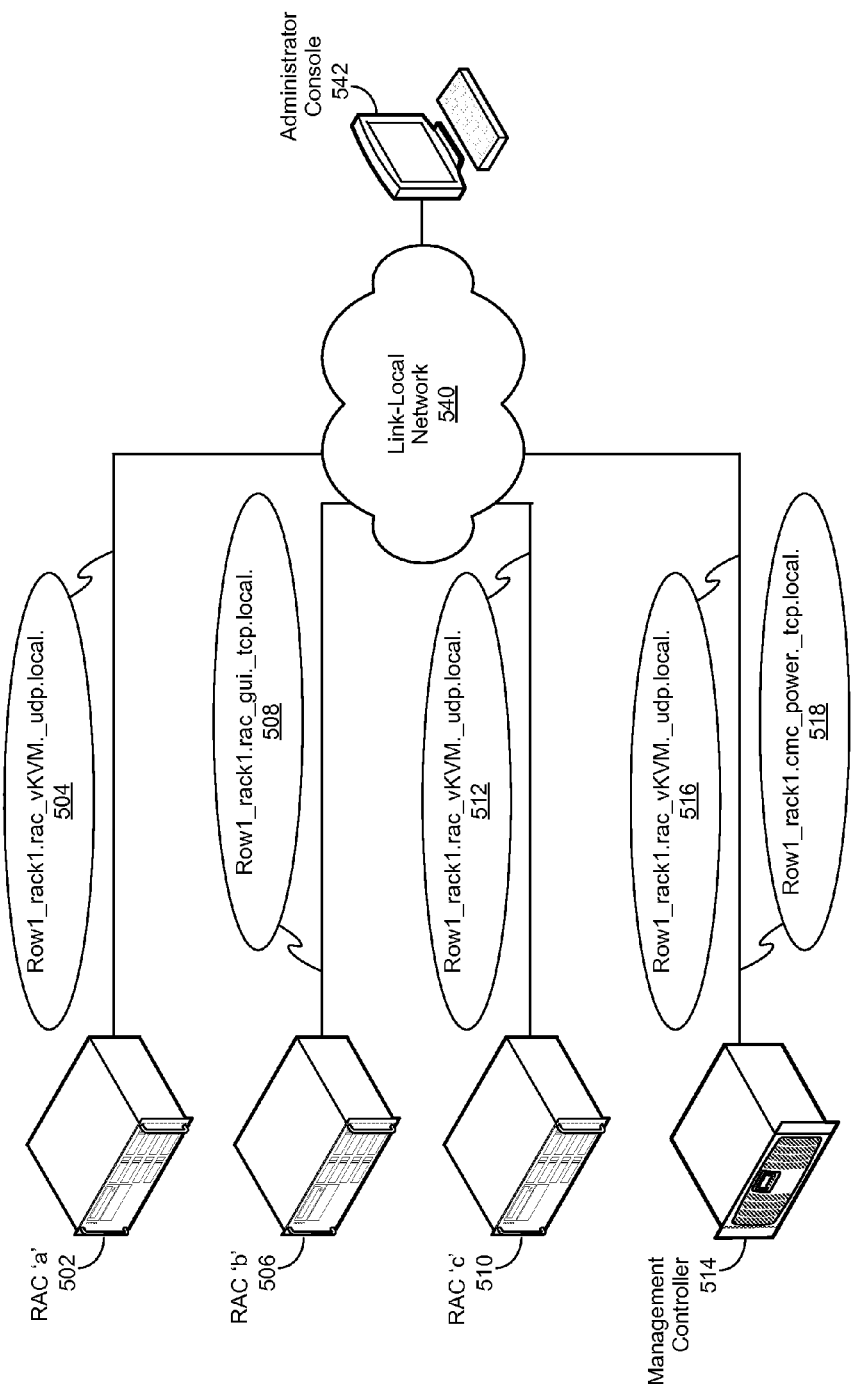

METHOD TO PUBLISH REMOTE MANAGEMENT SERVICES OVER LINK LOCAL NETWORK FOR ZERO-TOUCH DISCOVERY, PROVISIONING AND MANAGEMENT

BACKGROUND OF THE INVENTION

1. Field of the Invention

The present invention relates to the management of information handling systems. More specifically, embodiments of the invention provide a system, method, and computer-readable medium for realizing server management functionalities in the absence of a routable Internet Protocol (IP) network address for a remote access controller (RAC).

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a server, which is typically dedicated to running one or more services as a host on a network. The advent of cloud computing in recent years has made the use of servers increasingly common. As a result, it is not unusual for hundreds, if not thousands, of servers to be deployed in a given data center. Historically, servers were locally managed by an administrator through a shared keyboard, video display, and mouse (KVM). Over time, remote management capabilities evolved to allow administrators to monitor, manage, update and deploy servers over a network connection.

One example of these capabilities is the use of a remote access controller (RAC), which is operably coupled to, or embedded within, the server and remotely accessed by an administrator via an out-of-band communication link. As an example, the Integrated Dell Remote Access Controller (iDRAC) from Dell, Inc. has its own processor, memory, network connection, and access to the system bus. Integrated into the motherboard of a server, it provides out-of-band management facilities that allow administrators to deploy, monitor, manage, configure, update, troubleshoot and remediate the server from any location, and without the use of agents.

Accordingly, the use of a RAC for remote management of a server in a data center can be advantageous. However, it can also present challenges. For example, new servers usually arrive with default IP network address settings that have been set during the manufacturing process. However, each data center may have implemented predetermined network global settings requirements in order to provide a valid routable IP address for each RAC. As a result, an administrator may have to resort to manually determining the predetermined IP address for the RAC through the server's front panel controls before it can be remotely accessed for further administration. It will be appreciated that such approaches can be inconvenient, time consuming, and error-prone, especially when onboarding large numbers of servers.

SUMMARY OF THE INVENTION

A system, method, and computer-readable medium are disclosed for realizing server management functionalities in the absence of a routable Internet Protocol (IP) network address for a remote access controller (RAC). In various embodiments the Multicast Domain Name System (mDNS) protocol is implemented in a RAC. In one embodiment, the mDNS protocol is implemented in the firmware of the RAC. In one embodiment, the RAC is operatively coupled to a physical server. In another embodiment, the RAC is embedded in the physical server.

In these various embodiments, a RAC that is operatively coupled to a link-local network generates an mDNS IP multicast query message, which it then sends to a second device with an host operating system on the link-local network. In response, the second device, which includes a server CPU, returns its link-local IP address to the first device.

In one embodiment, outside a physical server unit, an mDNS is used in combination with the DNS-based Service Delivery (DNS-SD) protocol in a link-local network to identify host names of interest and different services hosted upon them. In these various embodiments, an mDNS IP multicast query message is combined with the DNS-SD message to generate an mDNS/DNS-SD query message, which is then sent to all devices on the link-local network. In response, the various devices respond with the services they respectively provide. As a result, all RACs and other management access controllers implemented on the same link-local IP network can exchange information with each other to perform server management functions without the use of a central server.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 is a simplified network diagram showing the implementation of the mDNS and DNS-SD protocols on a link-local network for the discovery of management functions provided as a service.

DETAILED DESCRIPTION

A system, method, and computer-readable medium for realizing server management functionalities in the absence of a routable Internet Protocol (IP) network address for a remote access controller (RAC). For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
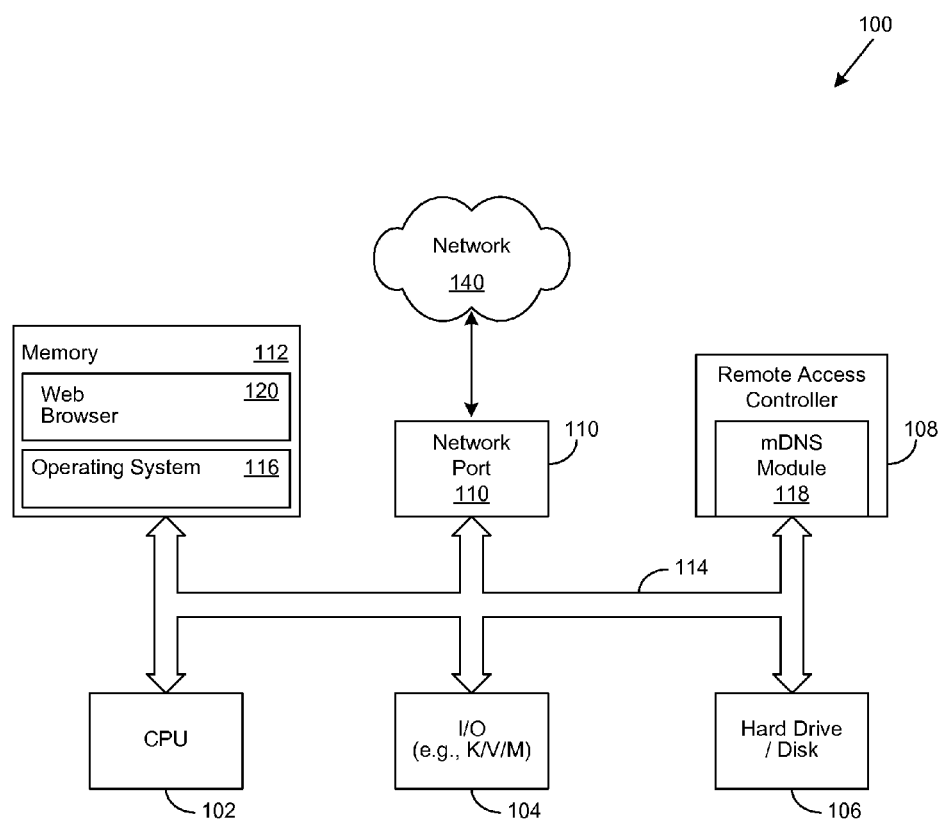
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems, such as a remote access controller (RAC) 108. In various embodiments, the RAC 108 includes a Multicast Domain Name System (mDNS) module 118. In one embodiment, the mDNS module 118 is operatively coupled to the RAC 108. In one embodiment, the mDNS module 118 is embedded in the RAC 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a web browser 120.

Figure 2:
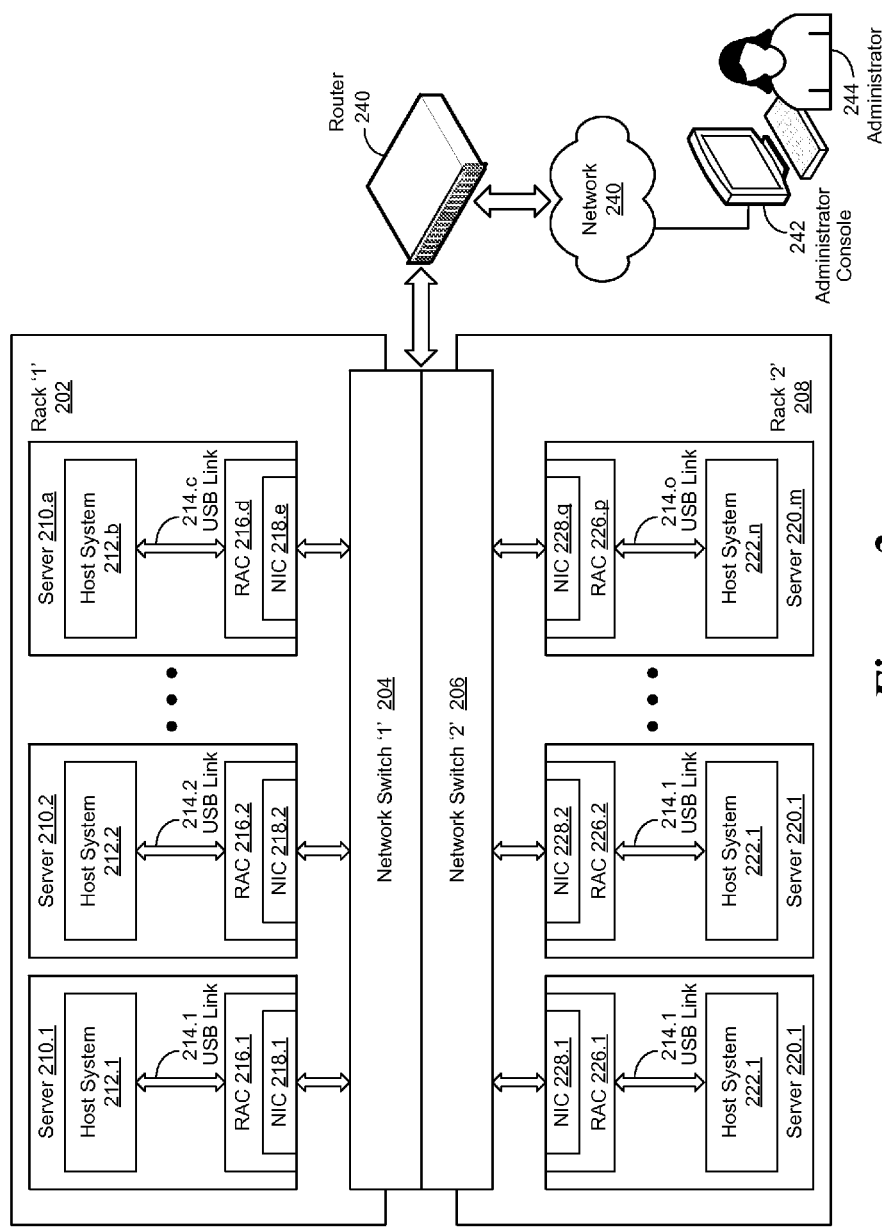
FIG. 2 is a simplified block diagram of a plurality of remote access controllers (RACs) implemented with a corresponding plurality of servers.

FIG. 2 is a simplified block diagram of a plurality of remote access controllers (RACs) implemented with a corresponding plurality of servers in accordance with an embodiment of the invention. As shown in FIG. 2, server rack '1' 202 includes a network switch '1' 204 and servers 210.1 and 210.2 through 210.a, where 'a' is an integer index greater than or equal to 2. In one embodiment, the servers 210.1 and 210.2 through 210.a respectively include a host system 212.1 and 212.2 through 212.b and a RACs 216.12 and 216.2 through 216.d, where 'b' and 'd' are integer indexes greater than or equal to 2. In one embodiment, the host systems 212.1 and 212.2 through 212.b are respectively coupled to the RACs 216.1 and 216.2 through 216.d via Universal Serial Bus (USB) links 214.1 and 214.2 through 214.c, where 'c' is an integer index greater than or equal to 2. In one embodiment, the RACs 216.1 and 216.2 through 216.d are respectively embedded in the servers 210.1 and 210.2 through 210.a. In one embodiment, the RACs 216.1 and 216.2 through 216.d respectively include a Network Interface Controller (NIC) 218.1 and 218.2 through 218.e, where 'e' is an integer index greater than or equal to 2. In one embodiment, the NICs 218.1 and 218.2 through 218.e are used to respectively couple the RACs 216.1 and 216.2 through 216.d to the network switch 'a' 204.

Server rack '2' 208 likewise includes a network switch '2' 206 and servers 220.1 and 220.2 through 220.m, where 'm' is an integer index greater than or equal to 2. In one embodiment, the servers 220.1 and 220.2 through 220.m respectively include a host system 222.1 and 222.2 through 222.n and RACs 226.1 and 226.2 through 226.p, where 'n' and 'p' are integer indexes greater than or equal to 2. In one embodiment, the host systems 222.1 and 222.2 through 222.b are respectively coupled to the RACs 226.1 and 226.2 through 226.p via USB links 224.1 and 224.2 through 224.o, where 'o' is an integer index greater than or equal to 2. In one embodiment, the RACs 226.1 and 226.2 through 226.p are respectively embedded in the servers 220.1 and 220.2 through 220.m. In one embodiment, the RACs 226.1 and 226.2 through 226.p respectively include a NIC 228.1 and 228.2 through 228.q, where 'q' is an integer index greater than or equal to 2. In one embodiment, the NICs 228.1 and 228.2 through 228.q are used to respectively couple the RACs 226.1 and 226.2 through 226.p to the network switch 'b' 206.

In one embodiment, network switch '1' 201 and network switch '2' 206 are communicatively coupled to respectively exchange data between servers 210.1 and 210.2 through 210.a and servers 220.1 and 220.2 through 220.m. In one embodiment, the network switches '1' 204 and '2' 206 are communicatively coupled via router to a link-local network 240. In one embodiment, the link-local network 240 is also communicatively coupled to an administrator console 242, which is used by an administrator 244 to administer RACs 216.1 and 216.2 through 216.d and RACs 226.1 and 226.2 through 226.p. In one embodiment, each of the RACs 216.1 and 216.2 through 216.d and RACs 226.1 and 226.2 through 226.p are assigned a unique link-local Internet Protocol (IP) address by the administrator 244.

As used herein, a link-local network refers to a private network that uses a private IP address space. These addresses are commonly used enterprise local area networks (LANs) when globally routable addresses are either not mandatory, or are not available for the intended network applications. These addresses are characterized as private because they are not globally delegated and IP packets addressed by them cannot be transmitted onto the public Internet. As the name implies, a link-local network uses link-local addresses, which refers to an IP address that is intended only for communications within a segment, or link, of a local network, or to establish a point-to-point network connection to a host.

Routers, such as router 240, do not forward packets with link-local IP addresses. Link-local IP addresses may be assigned manually by an administrator or by operating system procedures. They may also be assigned using stateless address autoconfiguration. In IPv4, their normal use is typically restricted to the assignment of IP addresses to network interfaces when no external, stateful mechanism of address configuration exists, such as the Dynamic Host Configuration Protocol (DHCP), or when another primary configuration method has failed. In IPv6, link-local addresses are generally utilized for the internal functioning of various protocol components.

Figure 3:
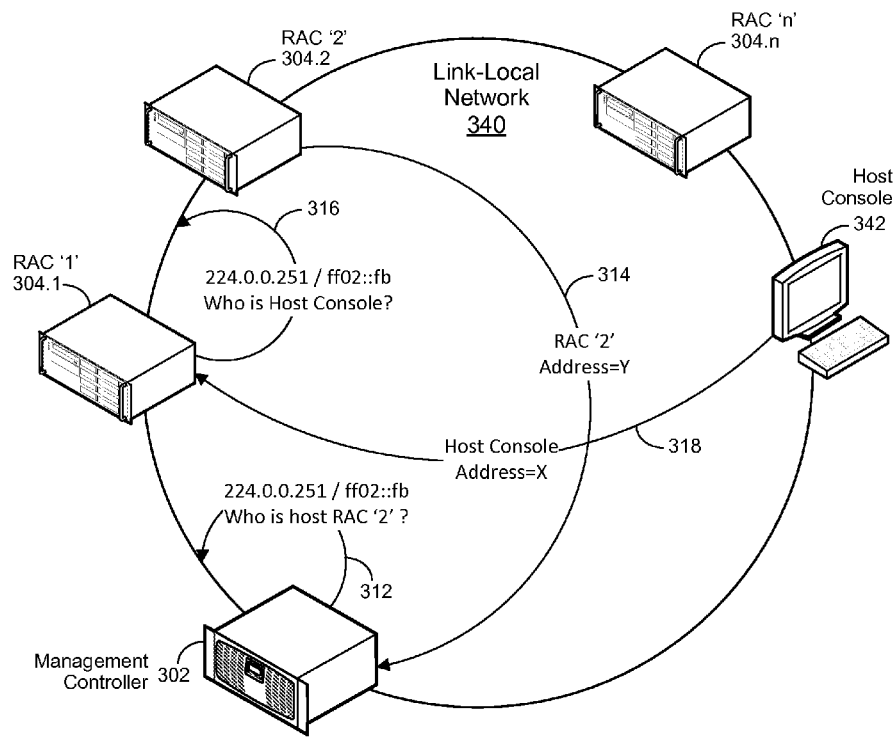
FIG. 3 is a simplified network diagram showing the implementation of the Multicast Domain Name System (mDNS) protocol in a link-local network.

FIG. 3 is a simplified network diagram showing the implementation of the Multicast Domain Name System (mDNS) protocol in accordance with an embodiment of the invention in a link-local network. Skilled practitioners of the art will be aware that mDNS provides a way of using familiar DNS programming interfaces, packet formats, and operating semantics in a small network without configuring a conventional DNS server. As such, it is useful in small networks that do not include a DNS server, yet it can also co-reside in network environments that do. In typical implementations, mDNS functionality is provided using IP multicast over User Datagram Protocol (UDP).

Using mDNS allows a client to determine the IP address of a target host (e.g., a host name) without the direct help of a centralized DNS server. To do so, the client machine sends an mDNS IP multicast query message to all hosts that share its local network, such as link-local network 340. In response, the target host replies with a multicast message announcing itself and its IP address. With this response, all machines in the subnet can update their mDNS cache with the target host's information. Those of skill in the art will also be familiar with the DNS-based Service Discovery (DNS-SD) protocol, which can be used to discover services provided by a host on a network. The hosts that offer these services publish details of available services, such as instance, service type, domain name and optional configuration parameters. Once discovered, DNS-SD allows a list of hosts providing a given service to be built.

In various embodiments, mDNS is used in combination with DNS-SD over a link-local network 340 to identify host names of interest and different services hosted upon them. In these various embodiments, a mDNS IP multicast query message is combined with the DNS-SD message to generate a mDNS/DNS-SD query message, which is then sent to all devices on the link-local network 340. In response, the various devices respond with the services they respectively provide. As a result, it is no longer necessary to associate services hosted by a RAC or a console with a routable IP address. Furthermore, various embodiments allow a link-local network to represent a collection of services that are available for subscription.

Referring now to FIG. 3, a management controller 302, remote access controllers (RACs) '1' 304.1 and '2' 304.2 through 'n' 304.n, where 'n' is an integer index greater than or equal to 2, and host console 342 are communicatively coupled via a link-local network 340. As shown in FIG. 3, the management controller 302 generates an mDNS IP multicast query message 312 (e.g., IP address 224.0.0.251/ff02::fb) to all hosts on the link-local network 340 to discover the IP address for RAC '2' 304.2. In response, RAC '2' 304.2 responds with an mDNS IP multicast response message Address='Y' 314, where 'Y' is the link-local IP address for RAC '2' 304.2. As likewise shown in FIG. 3, RAC '1' 304.1 generates an mDNS IP multicast query message 316 (e.g., IP address 224.0.0.251/ff02::fb) to all hosts on the link-local network 340 to discover the IP address for the host console 342. In response, the host console 342 responds with an mDNS IP multicast response message Address='X' 318, where 'X' is the link-local IP address for the host console 342.

From the foregoing, it will be appreciated that the implementation of mDNS allows all participating network devices on the link-local network 340 to perform standard DNS operations without the need of implementing a unicast DNS server. It will likewise be appreciated that the implementation of mDNS in accordance with the described embodiments reduces the need to manually update and maintain the link-local IP addresses corresponding to host names of devices on the link-local network 340.

Figure 4:
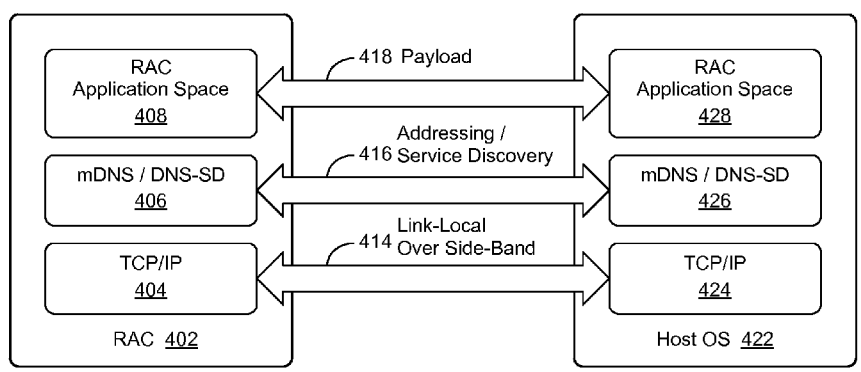
FIG. 4 is a simplified block diagram of the implementation of the mDNS and DNS Service Discovery (DNS-SD) protocols with a host operating system (OS) within the same physical server.

FIG. 4 is a simplified block diagram of the implementation of the Multicast Domain Name System (mDNS) and DNS Service Discovery (DNS-SD) protocols with a host operating system (OS) within the same physical server in accordance with an embodiment of the invention. In this embodiment, remote access controller (RAC) 402 includes a TCP/IP stack 404, an implementation of the mDNS and DNS-SD protocols 406, and a RAC application space 408. In one embodiment, the mDNS and DNS-SD protocols 406 are implemented in the RAC's 402 firmware. As shown in FIG. 4, the host OS 422 likewise includes a TCP/IP stack 424, an implementation of the mDNS and DNS-SD protocols 426, and a RAC application space 428.

In this and other embodiments, link-local data 414 is exchanged over a side-band network communications link between the RAC 402 and the Host OS 422 through their respective TCP/IP stacks 402 and 422. Likewise, IP address and service discovery data 416 is exchanged between the RAC 402 and the Host OS 422 through their respective mDNS/DNS-SD protocol implementations 406 and 426. RAC payload data is likewise exchanged between the RAC 402 and the Host OS 422 through their respective RAC application spaces 408 and 428. It will be appreciated that such embodiments provide the ability to access RAC services such as web-interface, command line interfaces, and so forth, from the local host by directly entering a service name in the local space rather than specifying the IP address or host name of the device.

FIG. 5 is a simplified network diagram showing the implementation of the Multicast Domain Name System (mDNS) and DNS-based Service Discovery (DNS-SD) protocols on a link-local network in accordance with an embodiment of the invention for the discovery of management functions provided as a service. In this embodiment, remote access controllers (RACs) 'a' 502, 'b' 506, and 'c' 510 are communicatively coupled to one another, along with a management controller 514 and an administrator console 542 via link-local network 540. In this and other embodiments, as described in greater detail herein, mDNS and DNS-SD protocols are implemented in conjunction with one another to discover management functions provided as a service by devices communicatively coupled to the link-local network 540.

As shown in FIG. 5, RACs 'a' 502, 'b' 506, and 'c' 510 respectively respond to a mDNS/DNS-SD query message with management function as a service responses "Row1_rack1.rac_vKVM._udp.local." 504, "Row1_rack1.rac_gui_tcp.local." 508, and "Row1_rack1.rac_vKVM._udp.local." 512. Likewise, the management controller 514 responds with management function as a service responses "Row1_rack1.rac_vKVM._udp.local." 516, and "Row1_rack1.cmc_power._tcp.local." 518.

In various embodiments, the management function as a service can be discovered through the implementation of mDNS/DNS-SD messages from RAC-to-RAC, RAC-to-consoles, or applications hosted by various operating systems. In these embodiments, each device communicatively coupled to the link-local network 540 would respond with its host name and link-local IP address, which will be cached in DNS query database of the request originator for future reference. From that point forward, the desired host can be easily reachable using the IP address until an IP reconfiguration occurs, in which case the preceding steps of host name and IP address rediscovery are repeated.

In certain embodiments, the described embodiments can be further expanded by integrating mDNS and DNS-SD services in conjunction with various management consoles that are deployed with the link-local network 540. As a result, the management console would be able to discover all newly-added RACs even before a valid global IP address was assigned to it. After discovering newly-added RAC interface link-local IP address, the most suitable RAC configuration file can then be sent by the console to each individual RAC.

Skilled practitioners will recognize that the unlike existing auto discovery approaches, the embodiments described in greater detail herein do not require an external provisioning server or DHCP server to deliver their respective functionality.

As likewise described in greater detail herein, a console (e.g., administrator console 542) implemented with the mDNS/DNS-SD capabilities can be deployed in the link-local network 540 to discover the list of host names that are being added. As a result, the console would be able to communicate with the newly-added devices using their link-local IP addresses, even though those IP addresses were not previously stored in the consoles DNS cache. Thereafter, upon receiving any new network settings from the console, the device can apply any new settings provided by the console.

In one embodiment, if an integrated RAC 'a' 502, 'b' 506, and 'c' 510 loses its license, such as through the replacement of its respective motherboard, its interface can be configured such that it can run on its link-local address. The administrator console 542 can then upload a previously backed-up license file based on the service tag of the RAC's corresponding server. Once the license is applied, the RAC can also be restored such that a motherboard replacement will be transparent for all other applications and consoles using the integrated RAC services for managing that server. In another embodiment, the importation of license data is realized by permitting link-local traffic on the dedicated network port only for license import network setting import operations. As a result, the license for the dedicated port can still be enforced for remote consoles and applications, but can take advantage of loading the license without customer intervention to a large group of servers.

From the foregoing, skilled practitioners of the art will recognize that the invention can facilitate the implementation of data center system management policies without the use of a centralized monitoring environment. For example, administrator can optimize the power utilization of a data center by sending a predetermined power utilization value to each RAC on the link-local IP network. Upon receiving this value, each RAC can respectively provide the real-time power utilization values of its associated server with other servers. Furthermore, software logic within each RAC can make intelligent power throttling decisions to limit power consumption by combining power utilization values received from other RACs. Moreover, other parameters such as the server's current processing load can be incorporated to comply with the data center's global power utilization policy.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for automating the acquisition of the link-local Internet Protocol (IP) network address of a remote access controller (RAC), comprising:
    using a first device to generate a Multicast Domain Name System (mDNS) IP multicast query message, the first device operatively coupled to a link-local network;
    using the first device to send the mDNS IP multicast query message to a second device, the second device comprising a RAC operatively coupled to the link-local IP network; and
    receiving a mDNS IP multicast response message from the second device, the mDNS IP multicast response message containing the link-local IP address of the RAC.

2. The method of claim 1, further comprising:
    using the first device to generate a DNS-based Service Discovery (DNS-SD) message;
    combining the mDNS IP multicast query message with the DNS-SD message to generate a mDNS/DNS-SD query message;
    using the first device to send the mDNS/DNS-SD query message to the second device; and
    receiving a response to the mDNS/DNS-SD query message from the second device, the response containing a management function as a service provided by the second device.

3. The method of claim 1, wherein the RAC is one of the set of:
    operatively coupled to a physical server embedded in a physical server.

4. The method of claim 2, wherein the RAC comprises firmware and the mDNS protocol is implemented in the firmware of the RAC.

5. The method of claim 4, wherein the DNS-SD protocol is implemented in the firmware of the RAC.

6. The method of claim 1, wherein the first device comprises at least one of the set of:
    a RAC;
    a host console;
    a management console; and
    a management controller.

7. A system comprising:
    a processor;
    a data bus coupled to the processor; and
    a non-transitory, computer-readable storage medium embodying computer program code for automating the acquisition of the link-local Internet Protocol (IP) network address of a remote access controller (RAC), the non-transitory, computer-readable storage medium being coupled to the data bus, the computer program code interacting with a plurality of computer operations and comprising instructions executable by the processor and configured for:

using a first device to generate a Multicast Domain Name System (mDNS) IP multicast query message, the first device operatively coupled to a link-local network;

using the first device to send the mDNS IP multicast query message to a second device, the second device comprising a RAC operatively coupled to the link-local IP network; and receiving a mDNS IP multicast response message from the second device, the mDNS IP multicast response message containing the link-local IP address of the RAC.

8. The system of claim 7, further comprising:

using the first device to generate a DNS-based Service Discovery (DNS-SD) message;

combining the mDNS IP multicast query message with the DNS-SD message to generate a mDNS/DNS-SD query message;

using the first device to send the mDNS/DNS-SD query message to the second device; and receiving a response to the mDNS/DNS-SD query message from the second device, the response containing a management function as a service provided by the second device.

9. The system of claim 7, wherein the RAC is one of the set of:

operatively coupled to a physical server embedded in a physical server.

10. The system of claim 8, wherein the RAC comprises firmware and the mDNS protocol is implemented in the firmware of the RAC.

11. The system of claim 10, wherein the DNS-SD protocol is implemented in the firmware of the RAC.

12. The system of claim 7, wherein the first device comprises at least one of the set of:

a RAC;

a host console;

a management console; and a management controller.

13. A non-transitory, computer-readable storage medium embodying computer program code for automating the acquisition of the link-local Internet Protocol (IP) network address of a remote access controller (RAC), the computer program code comprising computer executable instructions configured for:

using a first device to generate a Multicast Domain Name System (mDNS) IP multicast query message, the first device operatively coupled to a link-local network;

using the first device to send the mDNS IP multicast query message to a second device, the second device comprising a RAC operatively coupled to the link-local IP network; and receiving a mDNS IP multicast response message from the second device, the mDNS IP multicast response message containing the link-local IP address of the RAC.

14. The non-transitory, computer-readable storage medium of claim 13, further comprising:

using the first device to generate a DNS-based Service Discovery (DNS-SD) message;

combining the mDNS IP multicast query message with the DNS-SD message to generate a mDNS/DNS-SD query message;

using the first device to send the mDNS/DNS-SD query message to the second device; and receiving a response to the mDNS/DNS-SD query message from the second device, the response containing a management function as a service provided by the second device.

15. The non-transitory, computer-readable storage medium of claim 13, wherein the RAC is one of the set of:

operatively coupled to a physical server embedded in a physical server.

16. The non-transitory, computer-readable storage medium of claim 14, wherein the RAC comprises firmware and the mDNS protocol is implemented in the firmware of the RAC.

17. The non-transitory, computer-readable storage medium of claim 16, wherein the DNS-SD protocol is implemented in the firmware of the RAC.

18. The non-transitory, computer-readable storage medium of claim 13, wherein the first device comprises at least one of the set of:

a RAC;

a host console;

a management console; and a management controller.

* * * * *